June 11, 1946. C. GERST 2,401,864

CLUTCH STRUCTURE

Filed Nov. 19, 1943

INVENTOR.
CHRIS GERST
BY
ATT.

Patented June 11, 1946

2,401,864

UNITED STATES PATENT OFFICE 2,401,864

CLUTCH STRUCTURE

Chris Gerst, Dearborn, Mich.

Application November 19, 1943, Serial No. 510,987

3 Claims. (Cl. 192—93)

This invention relates in general to clutches and, more particularly, to friction clutches in which the driving connection between the friction elements of the clutch is effected by lever mechanism actuated upon by shiftable collar means.

The general object of the present invention is the provision of a simplified form of friction clutch which embodies shiftable cam and ball means arranged to effect engagement of the friction elements and permit disengagement of these friction elements when the cam and ball means are shifted in opposite directions.

Another object of the invention is the provision of a simplified form of friction clutch which embodies shiftable ball means and shiftable cam and collar means cooperating with said ball means in effecting engagement of the friction elements of the clutch and permitting disengagement of these friction elements by shifting of the cam and collar means in opposite directions.

A further object of the invention is the provision of a simplified form of friction clutch which embodies shiftable ball means and shiftable cam and collar means cooperating with said ball means in effecting engagement of the friction elements of the clutch and permitting disengagement of said friction element by shifting the cam and collar means in opposite directions to effect shifting of the ball means, in which clutch the cam and collar means are constructed to partly enclose and retain the ball means and to provide cam surfaces for effecting shifting of the ball means.

Still another object of the invention is the provision of a simplified form of friction clutch which embodies shiftable ball means and shiftable cam and collar means cooperating with said ball means in effecting engagement of the friction elements of the clutch with the said cam and collar means including a ring-shaped ball guiding base member, a ball retaining cam member slidably and non-rotatably mounted on said base member and a plurality of balls guided and retained by said base member and said cam member.

Still further objects and novel features of construction, combinations and relations of parts by which the objects in view have been attained, will appear and are set forth in detail in the course of the following specification.

The drawing accompanying and forming part of the specification illustrates certain practical embodiments of the invention, but it will be apparent as the specification proceeds that the structure may be modified and changed in various ways without departure from the true spirit and broad scope of the invention.

Figure 1:
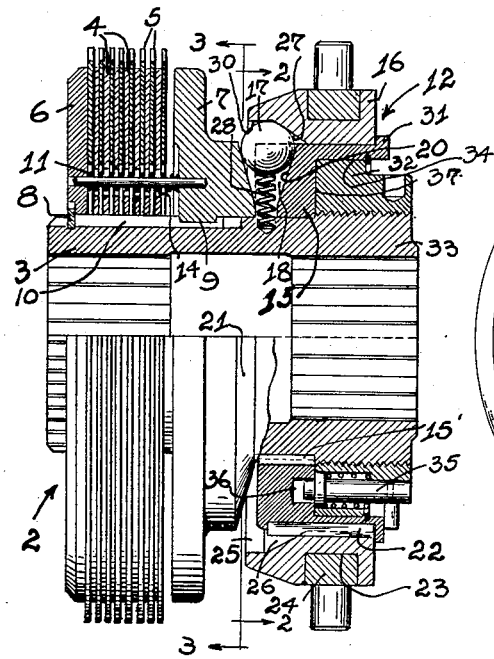
Fig. 1 is a longitudinal, sectional view, partly in elevation through a friction clutch embodying the invention.
Figure 2:
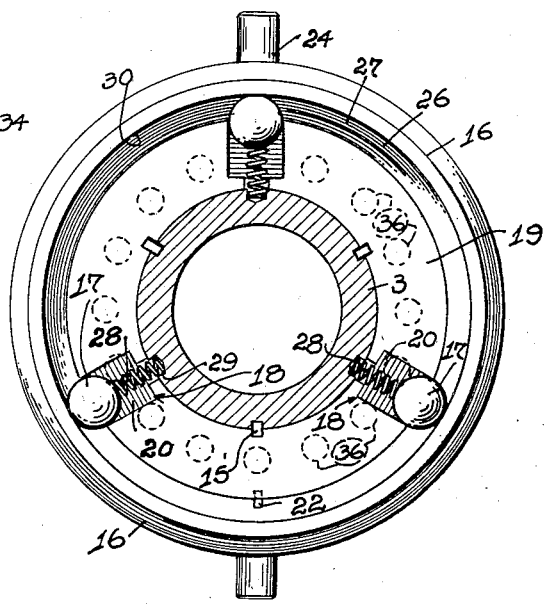
Fig. 2 is a cross-sectional view on line 2—2 of Fig. 1.
Figure 3:
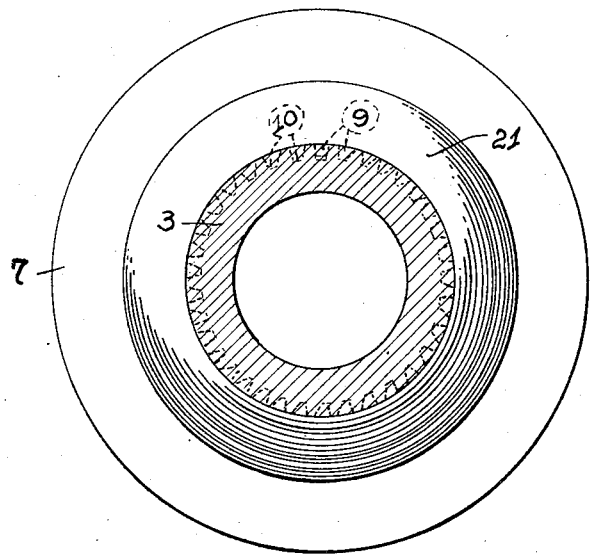
Fig. 3 is a cross-sectional view on line 3—3 of Fig. 1.

Referring now in detail to the exemplified form of clutch structure shown in the drawing, reference numeral 2 denotes a multi-plate friction clutch, the splined hub 3 of which is adapted to be secured to a shaft (not shown). Hub 3 slidably mounts a plurality of friction driven disks 4 for axial non-rotatable movement with respect thereto, and these disks cooperate with alternately disposed friction driving disks 5 having outer portions adapted to be axially shiftably secured to a driving member (not shown), all as customary.

The two sets of disks 4 and 5 are forced into frictional driving engagement by a pair of clamping members formed by a backing plate 6 and a pressure plate 7, the former contacting the left face of the collection of disks and the latter the right face. Backing plate 6 is held on hub 3 by split ring 8 and pressure plate 7 is slidably secured to said hub by the teeth 9 which extend into the grooves 10 of splined hub 3. Shifting of pressure plate 7 for engagement of friction disks 4 and 5 is effected by a ball and cam assembly 12, to be described hereinafter, and disks 4 and 5 are yieldingly retracted to released position by a plurality of springs 11 extended through bores 14 in disks 4 and abutting against the opposed faces of plates 6 and 7.

The thus constructed clutching arrangement is actuated by the ball and cam assembly 12 which is slidably and non-rotatably keyed to hub 3. This assembly includes a base ring member 15 slidably secured to hub 3 by means of keys 15', a shiftable collar member 16 slidably and non-rotatably mounted on the base ring member 15 and three steel balls 17 floatingly arranged in cam-like recesses 18 in base ring member 15. Recesses 18 are arranged radially in the face 19 of base member 15 opposite pressure plate 7 and have their rear walls 20 inclined to shift balls 17 which contact the cam surface 21 of pressure plate 7 toward said pressure plate when these balls are shifted in said recesses by collar member 16. This collar member, which is slidably and non-rotatably mounted on base ring member 15 by a key 22 and provided with a circumferential groove 23 for reception of the trunnions or shoes 24 of the customary shifting fork (not shown), includes at its inner end an enlarged bore having a cylindrical outer portion 25 adapted to retain balls 17 in proper working relation and an inner, cone-shaped portion 26, the circumferential cone-shaped wall 27 of which effects shifting of balls 17 in radial recesses 18 when collar member 16 is shifted toward pressure plate 7. During such operations, balls 17 when shifted in radial recesses 18 are simultaneously shifted laterally toward pressure plate 7 due to the inclination of the rear walls 20 of said recesses and shift pressure plate 7 into clutching position. Preferably, as shown, lateral shifting of pressure plate 7 is stepped up by inclining the surface 21 on said pressure plate so as to form a cam surface. Shifting of collar member 16 in an opposite direction frees balls 17 in their radial recesses 18 and permits their shifting in an opposite direction by compression springs 28 mounted in bores 29 in hub 3. Springs 28 engage the balls 17 and yieldingly force same into engagement with wall 30 of cylindrical bore 25 and shifting of collar member 16 in this direction is limited by a circumferential flange 31 on base ring member 15.

The cam and ball assembly, as stated above, is slidably and non-rotatably mounted on hub 3 and held in adjusted position by an internally threaded ring or collar 32 screwed upon the threaded end 33 of hub 3. This collar which extends into bore 34 in base ring member 15, limits the movement of said base ring member and provides for axial adjustment of the cam and ball assembly to take up wear, etc. For such purpose collar 32 carries a spring-pressed locking pin 35 cooperating with a series of bores 36 in the rear wall 37 of bore 34, which locking pin properly secures the assembly in adjusted position.

Figure 4:
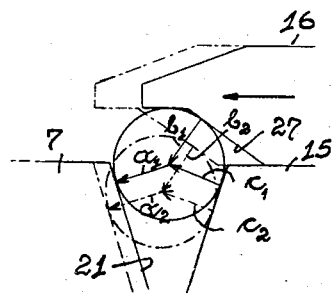
Fig. 4 is a diagrammatical view showing the relation of the shiftable ball means and the shiftable cam and collar means in operative and inoperative position of the clutch.

Preferably, the angular relation of the cam surfaces, i. e. the cone-shaped wall 27, the rear walls 20 of recesses 18 and the cam surface 21 of pressure plate 7 with respect to each other and the axis of the clutch is arranged so that in clutching operations the resultants of all forces applied on balls 17 are rectangularly related to cam surface 21 of pressure plate 7, so as to limit wear and tear on said balls and cam surface. This will readily be understood from an inspection of the diagram shown in Fig. 4, which diagram discloses in full line the position of the different elements before clutching operations and in dash-dotted line the positions taken up by these elements during clutching operations. It will be noted that in the full-line position the resultant $a^1$ of forces $b^1$ and $c^1$ is rectangularly related to the cam surface 21 and that in the dash-dotted-line position the resultant $a^2$ of the forces $b^2$ and $c^2$ is also rectangularly related to cam surface 21.

Having thus described my invention, what I claim is:

1. In a friction clutch structure a hub, a pressure plate with a cone-shaped outer surface slidably mounted on said hub, and a cam and ball assembly for shifting said pressure plate on said hub, said cam and ball assembly including a ring-shaped member mounted on said hub having radial cam slots arranged in the wall of said ring-shaped member opposite the cone-shaped outer surface of said pressure plate, balls in said slots, and radial springs in said slots yieldingly forcing said balls to floatingly contact the cam means of said ring-shaped member and the cone-shaped outer surface of said pressure plate, and ring-shaped cam means having an inner surface including a cylindrical surface portion and a cam surface portion, said cam means being slidably and non-rotatably mounted on said ring-shaped member and adapted to retain said balls and shift same toward said hub to effect shifting of said pressure plate.

2. In a friction clutch structure a hub, frictional clutching means mounted on one end portion of said hub including a shiftable pressure means, a pressure means shifting cam and ball assembly slidably and non-rotatably mounted on said hub including a ring-shaped member having cam means opposite said pressure means, spring-pressed balls mounted to floatingly contact said cam means and said pressure means, and ring-shaped cam means having an inner surface including a cylindrical and a cam surface portion, said cam means being slidably and non-rotatably mounted on said ring-shaped member for retaining and shifting said balls, and ring-shaped adjusting means threaded upon the other end portion of said hub, said ring-shaped member including a concentric recess in its wall and said adjusting means being extended into said recess and contacting the end and side walls thereof to support said ring-shaped member and shift same axially with respect to said pressure means when said adjusting means is rotated with respect to said hub and ring-shaped member.

3. In a friction clutch structure with shiftable pressure means an adjustably mounted actuating member for said pressure means, said actuating member embodying a shiftable ring member having its face opposite said pressure means radially slotted with slots having inclined bottom walls, and its other face centrally cylindrically recessed, spring-pressed balls in said slots cooperating with said pressure means in clutching operations, a second ring member shiftably mounted on said first ring member including cam means for radially shifting said balls, and rotatable adjusting means for said first ring member extended into and snugly fitting the cylindrical recess thereof for additionally supporting same.

CHRIS GERST.